US007714742B1

(12) United States Patent
Noworolski et al.

(10) Patent No.: US 7,714,742 B1
(45) Date of Patent: May 11, 2010

(54) WIRELESS MESH NETWORK PARKING MEASUREMENT SYSTEM

(75) Inventors: Jan Mark Noworolski, Burlingame, CA (US); Shih yu Cheng, Berkeley, CA (US); Tod Dykstra, San Francisco, CA (US); Scott Dykstra, Berkeley, CA (US)

(73) Assignee: Streetline Networks, San Francisco, CA (US)

( * ) Notice: Subject to any disclaimer, the term of this patent is extended or adjusted under 35 U.S.C. 154(b) by 277 days.

(21) Appl. No.: 11/513,721

(22) Filed: Aug. 31, 2006

Related U.S. Application Data

(60) Provisional application No. 60/596,100, filed on Aug. 31, 2006.

(51) Int. Cl.
*B60Q 1/48* (2006.01)

(52) U.S. Cl. ........................ 340/932.2; 340/531; 701/1; 701/2; 705/13; 370/331

(58) Field of Classification Search .............. 340/932.2, 340/531; 701/1, 2; 705/13; 370/331; 177/136
See application file for complete search history.

(56) References Cited

U.S. PATENT DOCUMENTS

| | | | | |
|---|---|---|---|---|
| 6,885,311 | B2 * | 4/2005 | Howard et al. | 340/932.2 |
| 2002/0009975 | A1 * | 1/2002 | Janusz et al. | 455/73 |
| 2003/0063585 | A1 * | 4/2003 | Younis et al. | 370/331 |
| 2003/0169183 | A1 * | 9/2003 | Korepanov et al. | 340/932.2 |
| 2004/0200644 | A1 * | 10/2004 | Paine et al. | 177/136 |
| 2005/0148828 | A1 * | 7/2005 | Lindsay | 600/300 |
| 2005/0231354 | A1 * | 10/2005 | Riedel et al. | 340/531 |
| 2005/0280555 | A1 * | 12/2005 | Warner, IV | 340/932.2 |

* cited by examiner

*Primary Examiner*—George A Bugg
*Assistant Examiner*—Sisay Yacob
(74) *Attorney, Agent, or Firm*—Lumen Patent Firm

(57) ABSTRACT

A real-time parking activity measurement system comprising multiple, self-powered, mesh networked wireless vehicle sensors, a collection device, and a host computer. The wireless mesh network architecture allows the wireless vehicle sensors to be more reliable and to be more energy efficient by at least an order of magnitude compare to traditional wireless point-to-point and star-topology architectures. This architecture also enables the expansion of the measurement area without any additional infrastructure besides the necessary addition of wireless vehicle sensors.

11 Claims, 2 Drawing Sheets

WIRELESS MESH NETWORK PARKING MEASUREMENT SYSTEM

CROSS-REFERENCE TO RELATED APPLICATIONS

This application claims the benefit of PPA Ser. No. 60/596,100, filed on Aug. 31, 2006 by the present inventors.

This invention relates to the measurement of parking space occupancy and usage using technologies enabled by a wireless mesh network. More specifically, it relates to a means for remote, automated monitoring of parking, increasing enforcement efficiency, and improving benefits and convenience for drivers.

BACKGROUND OF THE INVENTION

Parking enforcement operations account for a significant portion of public revenue in towns and cities. This revenue is generated both directly, from ticketing and fee collection at curbside or in garages and lots, and indirectly, from higher turnover rates resulting in increased sales taxes. Yet cities estimate that only 1% to 5% of violations are ticketed using existing enforcement tools and methods. Current enforcement methods are patrol-based, and involve either on-site checking of parked cars against payment information, indicated by a variety of payment systems, including single and multi-space meters and pay-and-display kiosks, or chalking-and-checking parked cars at unmetered curbside. These current methods are inefficient, because they provide no means to identify violations or measure usage remotely, and hence have no data to optimize parking control officer routes. Further, the lack of accurate real-time and historical information on curbside usage patterns prevents cities and private parking managers from measuring parking demand and formulating suitable parking policies.

From a user perspective, existing systems for payment are inconvenient. Few drivers carry the amount of change necessary to pay current rates at coin-operated systems, and credit and debit card systems, more common for multi-space parking management solutions such as pay-and-display, lack the ability to charge users for precise parking usage, usually forcing users to overpay for their stay. In addition, existing enforcement methods result in uneven ticketing and disproportionate penalties because parking managers do not have the resources to patrol all areas equally, and parking control officers cannot distinguish between vehicles parked a few minutes or several hours beyond allowed limits.

Hence, there are many benefits for having an automated parking usage measurement system that monitors parking activity remotely. Such a system would provide data for efficient and fair enforcement of parking, and facilitate convenient payment options for all end users of the system.

Prior to this invention, people have attempted vehicle sensing solutions that incorporate sensors as extensions of a traditional parking meter or multi-space meters. These sensors are usually directly wired into parking meters, and the resulting occupancy data is immediately consumed by individual meters instead of communicated back to a central location. As a result, parking space managers are unable to effectively use the occupancy data generated for policy and enforcement optimizations. In addition, while these wired sensing solutions are technologically simple and are made of rather inexpensive parts, the labor cost of installing these sensors is prohibitively expensive due to the cost of wiring, making them rather unpopular even in the most comprehensive parking management systems. One natural and obvious improvement to address this problem is to make all the sensors wireless. A slightly more efficient implementation would involve wireless sensors and a nearby base station to collect the sensor data, such that the power requirement at the sensors is reduced. Nevertheless, these wireless sensors are still too bulky for convenient installation, and their lifetime and reliability are insufficient for most applications.

SUMMARY

This invention, a wireless parking measurement system, includes a unique sensing system designed to dramatically reduce the power consumption of wireless vehicle sensors by using the sensors as routers in a wireless mesh network. Compared with conventional systems, the invention reduces power consumption by a factor of 50 to 500. The operational principles of this seemingly counterintuitive solution of increasing functionality of the sensors in order to save power is achieved by observing properties of radio wave propagation described in the detailed description section.

The parking measurement system continuously monitors parking occupancy in all areas in which it is deployed. Small, self-powered sensors, about the size of familiar lane guide reflectors, are affixed to a roadway or parking lot surface using common adhesives. The sensors detect parking activities by timing individual vehicle arrivals, departures and occupancy durations, noting all transitions between vehicles. While the sensors are producing valuable occupancy data, they are also functioning as an integral communication backbone, collectively forming a highly redundant low-power wireless mesh network used to transmit the occupancy data to a central server or servers. The mesh network design assures that the power consumption of self-powered devices in the system is minimized, allowing the self-powered wireless sensors to be very small and easily deployable while providing many years of unattended use. The path redundancy in the mesh network assures that data delivery is reliable, allowing the data on parking activity to be of sufficient reliability for payment, billing and parking enforcement. The system works equally well, for example, at designated parking spaces, whether diagonal or parallel to the curb, or at undemarcated or "packed" curbside. In addition, it can measure occupancy duration alone, or occupancy duration in conjunction with any other relevant regulatory information capable of entry into the network, such as payment or permit information.

This invention provides accurate measurement of parking activity, which would enable the simplification of parking resource management, and improve the efficiency of enforcement. Once in place, moreover, the network can support other valuable applications by carrying data from a range of other sensor types, delivering information on locations of car crashes or gunshots, for example, or providing remote metering of electricity, gas and water systems. Because each sensor is a wireless router, the network scales naturally as more sensors are added.

REFERENCE NUMERALS OF THE DRAWINGS

Figure 1:
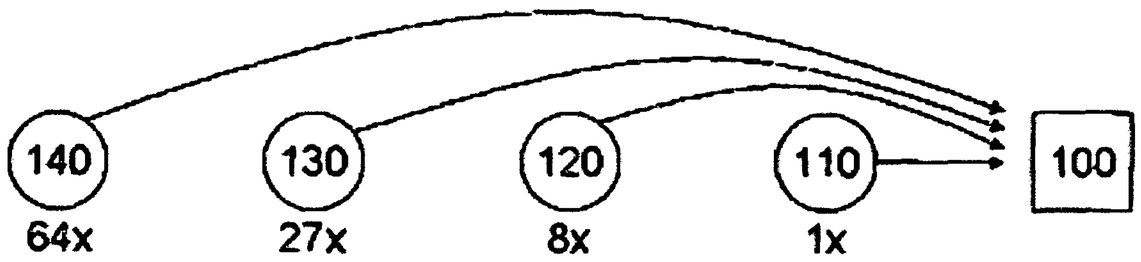
Fig. 1 Prior Art
FIG. 1 illustrates a typical communication mechanism employed by traditional wireless devices.

100 collection device
110 to 140 traditional wireless transceiver
200 collection device
210 to 240 multi-hop wireless transceiver
300 collection device
310 to 370 wireless mesh transceiver
410 parking space
420 wireless vehicle sensor
430 wireless mesh communication path
440 collection device
450 host computer
460 alternative sensor 1 in the form of a parking meter
470 alternative sensor 2 in the form of a fire hydrant sensor
480 alternative sensor three in the form of a traffic sensor

DETAILED DESCRIPTION

The wireless vehicle sensor depicted in this invention has several distinguishing qualities that enable it to be far superior to the simple application of wireless technology on existing vehicle sensors. The integration of the parking sensor with ultra low-power redundant mesh networks allows it to be battery-powered, compact, easy to install, long-lasting, and inexpensive. A properly designed wireless mesh network can lower the energy cost of wireless networking by a factor of 50 to 500 in a typical parking lot or curbside parking configuration, while at the same time increasing data reliability as compared with a traditional wireless network. Since wireless communication dominates energy expenditure in typical embodiment of these wireless vehicle sensors, a reduction of 100 times in power consumption would mean that the vehicle sensor can perform the same task with a battery almost 100 times smaller. As a direct result of this reduction in battery requirement, many of the distinguishing qualities of our wireless vehicle sensors mentioned above can be realized.

The wireless mesh network, however, is not a strict improvement over traditional wireless networks that assume either a point-to-point or star-shaped network topology. The wireless mesh network has many merits that made it ideal for the parking application; however, it also has many deficiencies that made it a very bad candidate for everyday wireless devices and WiFi applications. More specifically, the wireless mesh network has an extremely high network latency compared to a traditional point-to-point wireless network. In low-power parking applications, a wireless mesh network device would have a network latency of 10 to 100 times slower compared to a traditional wireless device. The software requirements for the wireless mesh network are also significantly higher than traditional wireless networks. Implementations of wireless mesh networking algorithms can easily be more than 5000 lines compared to hundreds of lines for implementations of regular wireless communication algorithms. The increase in software requirements usually entails increased memory and processing requirements on the wireless device. It may even call for a dedicated processor to do the networking computations, which would further increase the cost of a wireless mesh networking device compared to a traditional wireless networking device.

Nevertheless, none of these drawbacks are significant for the parking measurement application discussed in this invention. Instead of latencies on the order of milliseconds, it is sufficient to be notified of a parking event on the order of seconds, hence the latency deficiency is irrelevant. The cost of additional computational hardware is undesirable, but is dwarfed by the immense cost savings from the reduction of battery requirements, making the trade-off economically sound.

It is mentioned previously that in typical embodiments, the energy cost of networking dominates energy expenditure in a wireless vehicle sensor, thus reducing energy cost of networking alone would have a dramatic impact on the total energy efficiency of the sensor. Wireless mesh networking minimizes the energy expenditure on the radio as the following example illustrates: in a typical parking situation where there are 20 parking spaces per block on one side of the curb; given any placement of the radio receiver, the radio signal from the farthest nodes must travel at least 10 spaces to the receiver. One skilled in the art of radio wave propagation will appreciate that the attenuation from a radio source increases with a function of distance cubed when both the radio source and radio receiver are near the ground. If it takes one unit of energy to transmit one message across a parking space, then the energy required to transmit the same message across 10 parking spaces would be 10 cubed, which is 1000 units. In contrast, a mesh network would be able to accomplish the same task by "hopping" the message one space at a time across 10 spaces, using one unit of energy 10 times, resulting in a total energy expenditure of 10 units, which is 100 times more efficient than the traditional point-to-point method. This figure is even better if the ratio of parking spaces to receivers is higher. For example, across 20 spaces, the energy expenditure ratio would be 8000 units for the traditional method and 20 units for the multi-hop method. This figure is approximate because for each radio transmission, there is a processing energy cost. Nevertheless, the processing energy cost associated with networking is generally negligible compared to the radio-transmission energy cost. In realistic implementations of the wireless mesh network, redundant paths would be used to improve reliability at the expense of energy efficiency. As a result, the wireless mesh network would not be as efficient as the multi-hop-only example described above, but it would still be orders of magnitude more efficient then a traditional wireless network.

FIG. 1 illustrates a typical communication mechanism employed by traditional wireless devices. The square box represents a wireless collection device, and the circles with numbers inside represent wireless devices with a transceiver capable of transmitting a message back to the collection device. The number beneath each circle is the amount of energy required to deliver one message to the collection device compared to the amount of energy required to deliver one message across a single space. That amount of energy is determined by the distance from the transmitter to the receiver cubed. For example, transceiver 140, which is 4 spaces away from the collection device, must use 64 times the energy to deliver the same message to the collection device compared to transceiver 110 which is 1 space away. Note that the most power-hungry device is the one furthest from the receiver because the energy cost of radio transmission increase as receiver-to-transmitter distance cubed.

Traditional point-to-point wireless networks are particularly unsuited for reliable operation in parking applications. Point-to-point radio communications may be completely blocked by metal objects, such as cars and trucks, positioned between the transmitter and receiver. In parking applications, a single parked vehicle may obstruct the radio communication path for as long as that vehicle is parked. Additionally, a line of vehicles in congested traffic may effectively block transmission for hours at a time, also resulting in complete failure of communications.

Figure 2:
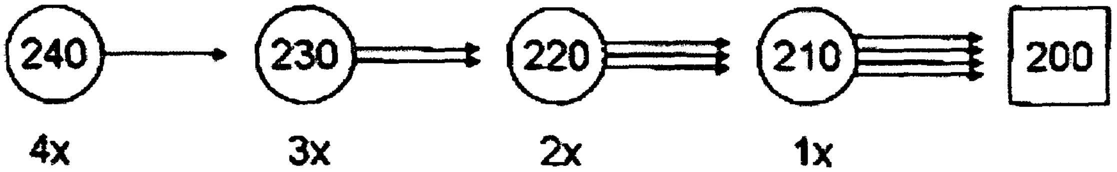
Fig. 2 Prior Art
FIG. 2 illustrates the multi-hopping communication mechanism employed by a wireless mesh network in its simplest form.

FIG. 2 illustrates how the multi-hopping property of wireless mesh networking functions in its simplest form. The circles represent transceivers, and the square represents the collection device. The arrows indicate radio transmissions, and the numbers beneath each circle, again, indicate relative energy expenditure as in FIG. 1. In this example, transceiver 240 would need only 1 unit of energy to send its message to the collection device. However, the message from transceiver 240 would have consumed 4 units of energy in the network by the time it reaches the collection device. This behavior is caused by each device having to expend energy to transmit its own message and all messages sent from further devices that must be routed through it. As a result, the most power-hungry device is the one closest to the receiver because it must route all messages from devices attached to its communication chain.

In terms of reliability, the multi-hop-only communications scheme is even worse than the traditional point-to-point or star-topology network. Obstruction of a single radio communication path can block communication not only from the one device at which the obstruction occurs, but also from all other devices which rely on the obstructed device for message routing.

Figure 3:
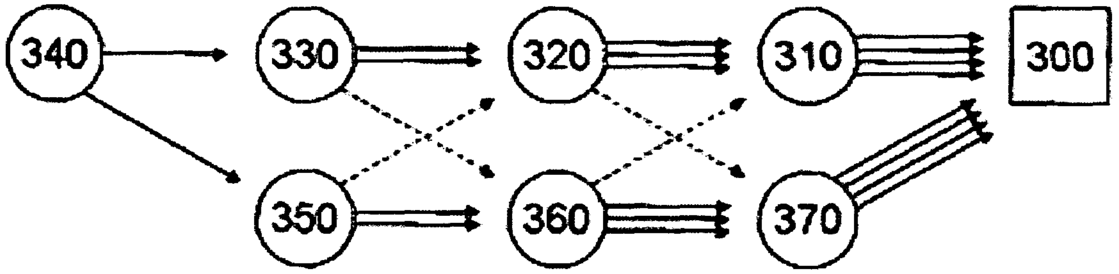
Fig. 3 Prior Art
FIG. 3 illustrates the multi-hopping communication mechanism and communication path redundancy employed by a wireless network to achieve both high energy efficiency and high reliability.

FIG. 3 illustrates how a wireless mesh network functions in a multi-hop redundant configuration. The circles and squares, again, represent transceivers and collection device as depicted in FIG. 1 and FIG. 2. The solid arrows, again, represent radio transmissions. In this example, transceiver 340 replicated its communication path completely, using approximately twice as much energy as transceiver 240 in FIG. 2. Nevertheless, even at twice the energy consumption compared to the multi-hop wireless network depicted in FIG. 2, the wireless mesh network depicted in FIG. 3 is still significantly more energy efficient than the traditional wireless networking method depicted in FIG. 1. Yet the reliability of message delivery in the network depicted in FIG. 3 is significantly improved over the networks depicted in both FIG. 1 and FIG. 2.

In realistic implementations, completely redundant paths are not necessary because radio waves travel omnidirectionally. For example, a message sent by transceiver 350 would reach transceiver 340, 330, 320, and 360, creating 4 potential paths to route the message. The dotted arrows indicate many such alternative paths available to the wireless mesh transceivers for message route selection. If all alternative paths were to fail, each retransmission is more efficient because each retransmission can be received by all devices within range, increasing the probability that at least one device would receive the message and route it toward the collection device. Many complicated and intelligent routing algorithms have been developed over the years by wireless mesh networking research communities to take advantage of this omnidirectional radiowave propagation property. The result is a set of algorithms that intelligently adapt routing paths for energy efficiency and reliability. The precise detail of many wireless mesh network routing algorithms can be found online in various academic publications from research Institutes such as UC Berkeley, UCLA, and MIT.

To support wireless mesh networking and sensor signal conditioning, each wireless vehicle sensor would have computing and digital signal processing capabilities. These capabilities may also be used to perform computation on a number of individual sub-sensor readings, including, for example, magnetic field sensors, IR sensors, capacitance sensors, or solar sensors, to determine the presence of a vehicle. Vehicle detection may be further aided by creating a digital 'signature' comprising a mathematical combination of individual sub-sensor readings. This 'signature' may be designed to vary considerably from vehicle to vehicle, and even with vehicle position relative to the wireless vehicle sensor. In a further refinement of the invention, the wireless vehicle sensors may be placed at precisely known locations and intervals, such that readings from one or more wireless vehicle sensors in combination with location and time data may be used to accurately determine parking events in one or more non-delineated parking spaces, parallel, perpendicular or diagonal parking spaces, or designated spaces in parking lots.

Figure 4:
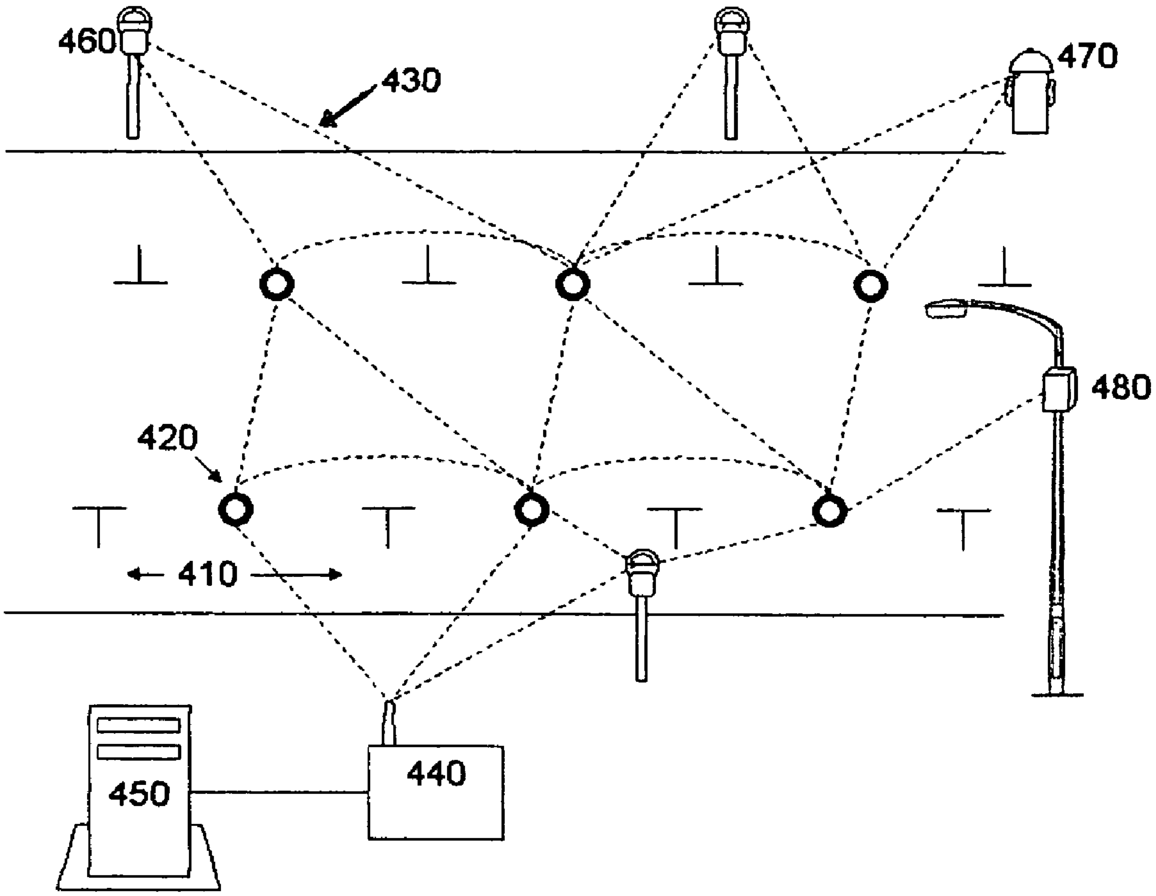
FIG. 4 shows an embodiment of the on street parking measurement application.

FIG. 4 shows an embodiment of the on-street parking measurement application. The system includes one or more parking spaces 410, monitored by wireless vehicle sensors 420, networked via a wireless mesh network, to a collection device 440. The collection device is networked further to a remotely located host computer 450.

The wireless mesh network serves to provide energy efficient and redundant paths for all sensor data to reach the collection device. Each sensor communicates directly to at least one other sensor and also acts as a relay for sensor data from other sensors. Thus, sensor data can make its way in a multi-hop manner to the collection device 440 and thereafter to the host computer. Those skilled in the art will appreciate that a well-configured mesh network will provide a degree of failure tolerance of individual paths and can further support multiple collection devices. Consequently, a sensor failure can be rapidly localized and will not result in a network outage.

Also shown are alternative sensors 460, 470, and 480, incorporated into the same wireless mesh network. Such sensors can be easily deployed given the existence of the wireless mesh network coverage formed by the wireless vehicle sensors. Examples of alternative sensors can include, but are not limited to, gunshot detectors, car crash detectors, fire hydrant pressure sensors 470, parking payment sensors 460, or other traffic monitoring sensors 480. As these additional sensors are added, the wireless mesh network coverage expands naturally, allowing even more sensors to be deployed in the surrounding area. In the meantime, the reliability of existing sensors are also improved by the availability of additional alternative routing paths.

Data from all sensors can be processed at any or all levels of the resulting system, including at the sensor itself, at the collection device, or at the host computer. However, it is advisable that the sensors should do as much processing as possible in order to reduce the amount of data they need to send, and hence the amount of power they consume.

To further improve the portability of this wireless parking measurement system, one skilled in the art can appreciate that the communication between the collection device and the host computer can be effected via many methods, including, but not limited to: direct connection, cellular connection, wireless LAN, or wireless WAN.

What is claimed is:

1. A parking measurement system comprising:

a. a collection device configured to collect data generated from a wireless mesh network;

b. at least one host computer;

c. a plurality of self-powered wireless vehicle sensors, wherein each said self-powered wireless vehicle sensor is associated with at least one parking space and is configured to function also as a wireless mesh network device in said wireless mesh network, wherein each said wireless vehicle sensor is disposed to route a first data from its own vehicle sensor and a second data from other said wireless mesh network devices to said collection device;

d. a plurality of wireless parking payment sensors, wherein each said wireless parking payment sensor is associated with at least one parking space and is configured to function also as a wireless mesh network device in said wireless mesh network, wherein each said wireless parking payment sensor is disposed to route a first data from its own parking payment sensor and a second data from other said wireless mesh network devices to said collection device; and e. a communication device disposed to provide communication between said host computer and said collection device, wherein said host computer is a sufficiently programmed computer to convert raw parking activity data collected by said collection device into data that is used by other parking applications or interface software on another sufficiently programmed computer, wherein said parking measurement system is disposed to be expandable by implementing other said self powered wireless vehicle sensors within a communication range of at least one other said self powered wireless vehicle sensor in said parking measurement system.

2. The parking measurement system of claim 1, wherein said at least one other sub-sensor comprises a magnetic field sensor.

3. The parking measurement system of claim 1, wherein at least one other sub-sensor comprises an IR sensor.

4. The parking measurement system of claim 1, wherein at least one other sub-sensor comprises a capacitive sensor.

5. The parking measurement system of claim 1, wherein at least one other sub-sensor comprises a solar sensor.

6. The parking measurement system of claim 1, wherein said wireless sensors are disposed in predetermined locations and intervals, wherein information provided by at least one said wireless sensor is compiled with said predetermined wireless sensor location and intervals to determine vehicle proximity, presence or payment in non-delineated parking spaces.

7. The parking measurement system of claim 1, wherein said sensors further comprise a self-calibrating element.

8. The parking measurement system of claim 1, wherein said collection device is powered by an external power source.

9. The parking measurement system of claim 1, wherein said host computer compiles said parking event data and outputs statistics of said parking events, wherein said statistics comprise temporal parking demand.

10. The parking measurement system of claim 1, wherein said at least one other sub-sensor comprises a magnetic field sensor and a solar sensor.

11. The parking measurement system of claim 1, wherein said at least one other sub-sensor comprises a magnetic field sensor and an IR sensor and a solar sensor.

* * * * *